(12) United States Patent
Wakazono et al.

(10) Patent No.: US 10,944,942 B2
(45) Date of Patent: Mar. 9, 2021

(54) IMAGE PROCESSING APPARATUS, IMAGE PROCESSING METHOD, AND PROGRAM

(71) Applicant: Sony Corporation, Tokyo (JP)

(72) Inventors: Masafumi Wakazono, Tokyo (JP); Yoshimi Tsuboi, Tokyo (JP); Tadashi Yamaguchi, Saitama (JP); Haruka Asai, Tokyo (JP); Kazumi Fukuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 41 days.

(21) Appl. No.: 16/307,048

(22) PCT Filed: Jun. 13, 2017

(86) PCT No.: PCT/JP2017/021791
§ 371 (c)(1),
(2) Date: Dec. 4, 2018

(87) PCT Pub. No.: WO2018/025505
PCT Pub. Date: Feb. 8, 2018

(65) Prior Publication Data
US 2019/0259138 A1    Aug. 22, 2019

(30) Foreign Application Priority Data

Aug. 1, 2016 (JP) .............................. JP2016-151139

(51) Int. Cl.
*H04N 9/04* (2006.01)
*H04N 5/232* (2006.01)
(Continued)

(52) U.S. Cl.
CPC ......... *H04N 9/04517* (2018.08); *G06T 5/006* (2013.01); *H04N 5/2176* (2013.01);
(Continued)

(58) Field of Classification Search
CPC ............. H04N 5/2176; H04N 5/23203; H04N 5/3572; H04N 9/045; H04N 9/04517; G03B 17/14; G06T 5/006; G06T 2207/10004
See application file for complete search history.

(56) References Cited

U.S. PATENT DOCUMENTS 6,650,365 B1 *  11/2003  Sato ................... H04N 1/32112
                                                              348/231.3
8,194,993 B1 *   6/2012  Chen ...................... H04N 5/772
                                                              382/254
(Continued)

FOREIGN PATENT DOCUMENTS

CN      101086864 A     12/2007
CN      102480590 A      5/2012
(Continued)

OTHER PUBLICATIONS

Extended European Search Report dated Jun. 7, 2019 for corresponding European Application No. 17836612.6.
(Continued)

*Primary Examiner* — Daniel M Pasiewicz
(74) *Attorney, Agent, or Firm* — Michael Best & Friedrich LLP

(57) ABSTRACT

In a case where it is determined by a reliability determination section 501 that retention aberration information of an in-apparatus aberration information retention section 31 is unreliable, a control section 50 sets detection aberration information generated by performing aberration detection processing by a lens aberration detection processing section 32 as application aberration information for correcting an aberration of a captured image. In a case where it is determined that the retention aberration information is reliable, the control section 50 sets the retention aberration
(Continued)

information as the application aberration information. Aberration information can be generated if necessary.

21 Claims, 9 Drawing Sheets

(51) Int. Cl.
| | |
|---|---|
| *H04N 5/357* | (2011.01) |
| *G06T 5/00* | (2006.01) |
| *H04N 5/217* | (2011.01) |
| *G03B 17/14* | (2021.01) |

(52) U.S. Cl.
CPC ......... *H04N 5/232* (2013.01); *H04N 5/23203* (2013.01); *H04N 5/3572* (2013.01); *G03B 17/14* (2013.01); *G06T 2207/10004* (2013.01); *G06T 2207/30168* (2013.01); *H04N 9/0451* (2018.08)

(56) References Cited

U.S. PATENT DOCUMENTS

| | | | |
|---|---|---|---|
| 2007/0116375 A1 | 5/2007 | Utsugi et al. | |
| 2010/0309342 A1* | 12/2010 | Nagata | H04N 5/23209 |
| | | | 348/241 |
| 2011/0249154 A1 | 10/2011 | Kawase et al. | |
| 2012/0002113 A1 | 1/2012 | Nishio et al. | |
| 2012/0081583 A1 | 4/2012 | Kikuchi et al. | |
| 2012/0300112 A1 | 11/2012 | Natsume | |
| 2015/0049216 A1* | 2/2015 | Kano | H04N 5/23209 |
| | | | 348/231.6 |
| 2015/0085164 A1 | 3/2015 | Tanae et al. | |
| 2016/0027155 A1 | 1/2016 | Naruse et al. | |
| 2016/0337563 A1* | 11/2016 | Yakita | H04N 5/2254 |

FOREIGN PATENT DOCUMENTS

| | | |
|---|---|---|
| CN | 104236856 A | 12/2014 |
| JP | 2010-130033 A | 6/2010 |
| JP | 2010206553 A | 9/2010 |
| JP | 2011215395 A | 10/2011 |
| JP | 2011-223217 A | 11/2011 |
| JP | 2012-198273 A | 10/2012 |
| JP | 2015070296 A | 4/2015 |
| JP | 2016-105568 A | 6/2016 |
| WO | 2008/044591 A1 | 4/2008 |

OTHER PUBLICATIONS

Japanese Office Action dated Aug. 4, 2020 for corresponding Japanese Application No. 2018-531759.
Chinese Office Action dated Jun. 18, 2020 for corresponding Chinese Application No. 201780045758.9.

* cited by examiner

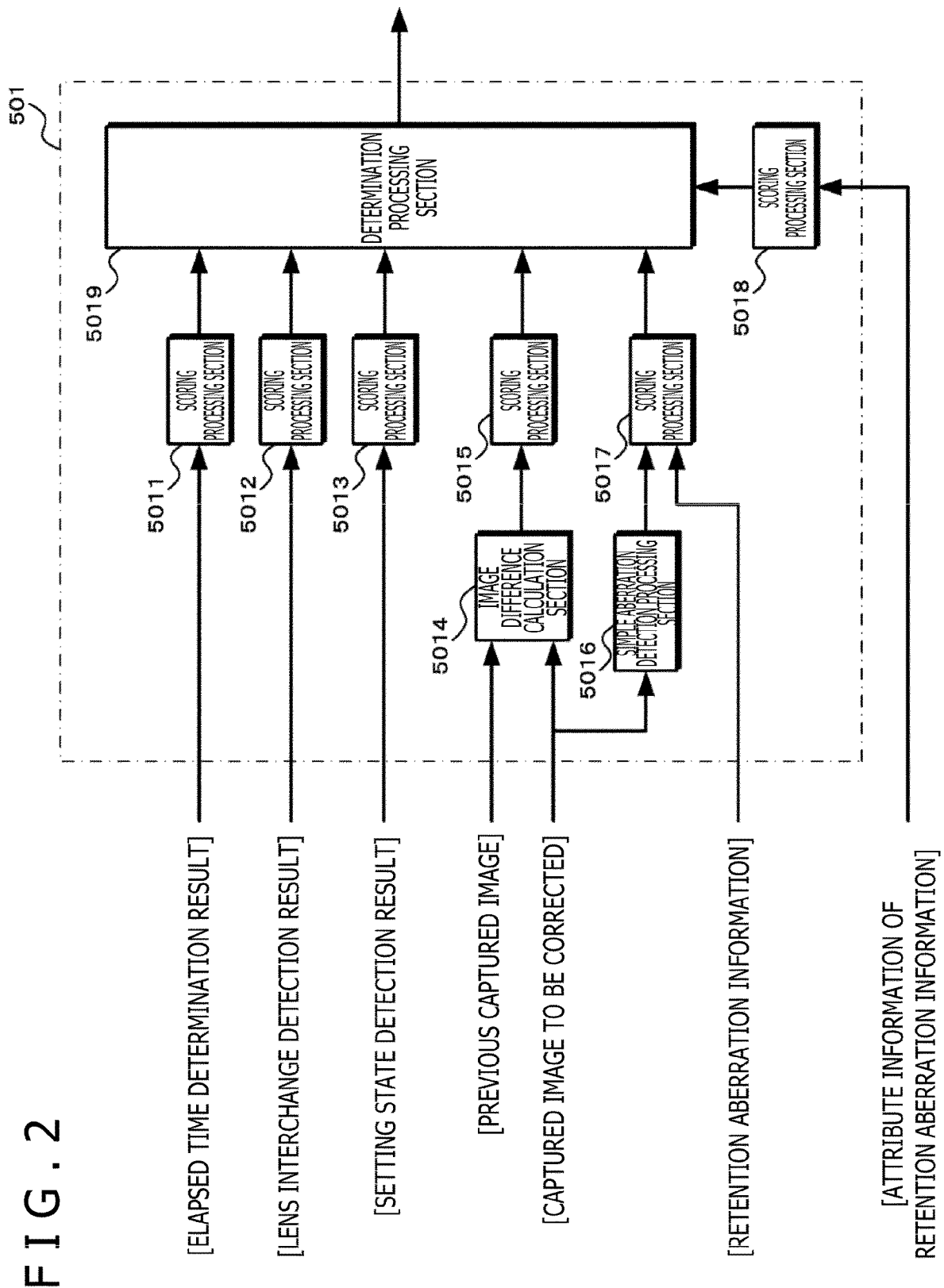

FIG. 3

| KIND OF ABERRATION | CHARACTERISTIC AREA | DETECTION OF CORRECTION PARAMETER | CORRECTION METHOD |
|---|---|---|---|
| MAGNIFICATION CHROMATIC ABERRATION | PERIPHERAL PORTION OF SCREEN | WAVEFORM MATCHING OF COLOR SIGNAL | PIXEL VALUE OF COLOR SHIFT DESTINATION IS CALCULATED |
| AXIAL CHROMATIC ABERRATION | CONTOUR OF BALL BLUR | DETECTION OF WIDTH OF UNDERSHOOTS/OVERSHOOTS OF COLOR DIFFERENCE SIGNAL | COLOR SIGNALS ON PERIPHERY (RANGE OF DETECTED WIDTH) OF CONTOUR ARE REPLACED WITH PERIPHERAL COLOR SIGNALS |
| PURPLE FRINGE | HIGH-CONTRAST EDGE | AREA WIDTH OF FALSE COLOR IN LOW-LUMINANCE AREA | COLOR SIGNALS IN PURPLE AREA (RANGE OF AREA WIDTH IN WHICH FALSE COLOR OCCURS) ON PERIPHERY OF CONTOUR IN HIGH-CONTRAST LOW LUMINANCE AREA ARE REPLACED WITH PERIPHERAL COLOR SIGNALS |
| ASTIGMATISM | LUMINESCENT SPOT (E.G., STARS IN NIGHT SKY, ETC.) | POINT SPREAD CHARACTERISTIC FOR EACH IMAGE HEIGHT (PSF: Point spread function) | FILTER PROCESSING BY REVERSE CHARACTERISTIC OF POINT SPREAD CHARACTERISTIC IS PERFORMED |

F I G. 4

(a)

| DETERMINATION RESULT | TOTAL SCORE VALUE<Tha | TOTAL SCORE VALUE>=Tha |
|---|---|---|
| | UNRELIABLE | RELIABLE |
| ACTION | ABERRATION DETECTION PROCESSING IS PERFORMED (DETECTION ABERRATION INFORMATION IS GENERATED AND USED AS APPLICATION ABERRATION INFORMATION) | ABERRATION DETECTION PROCESSING IS NOT PERFORMED (RETENTION ABERRATION INFORMATION IS USED AS APPLICATION ABERRATION INFORMATION) |

(b)

| DETERMINATION RESULT | TOTAL SCORE VALUE<Th1 | Th1<=TOTAL SCORE VALUE<Th2 (Th1<Th2) | TOTAL SCORE VALUE>=Th2 |
|---|---|---|---|
| | UNRELIABLE | RELIABLE | RELIABLE |
| ACTION | ABERRATION DETECTION PROCESSING IS PERFORMED (DETECTION ABERRATION INFORMATION IS GENERATED AND USED AS APPLICATION ABERRATION INFORMATION) | ABERRATION DETECTION PROCESSING IS NOT PERFORMED (SIMPLE ABERRATION INFORMATION IS USED AS APPLICATION ABERRATION INFORMATION) | ABERRATION DETECTION PROCESSING IS NOT PERFORMED (RETENTION ABERRATION INFORMATION IS USED AS APPLICATION ABERRATION INFORMATION) |

(c)

| DETERMINATION RESULT | TOTAL SCORE VALUE<Thb | TOTAL SCORE VALUE>=Thb |
|---|---|---|
| | UNRELIABLE | RELIABLE |
| ACTION | ABERRATION DETECTION PROCESSING IS PERFORMED (DETECTION ABERRATION INFORMATION IS GENERATED AND USED AS APPLICATION ABERRATION INFORMATION) | ABERRATION DETECTION PROCESSING IS NOT PERFORMED (RETENTION ABERRATION INFORMATION IS USED AS APPLICATION ABERRATION INFORMATION) |

FIG. 6

| | ELAPSED TIME DETERMINATION | INTERCHANGE DETECTION | SETTING STATE DETECTION | IMAGE DIFFERENCE CALCULATION | SIMPLE DETECTION |
|---|---|---|---|---|---|
| IN THE CASE WHERE THERE IS PRESENT IN-LENS RETENTION ABERRATION INFORMATION | ○ | × | × | ○ | ○ |
| IN THE CASE WHERE THERE IS NO IN-LENS RETENTION ABERRATION INFORMATION (INFORMATION OF SIMPLE DETECTION IS PRIORITIZED) | ○ | × | × | × | ○ |
| IN THE CASE WHERE THERE IS NO IN-LENS RETENTION ABERRATION INFORMATION (INFORMATION OF INTERCHANGE DETECTION/ SETTING STATE DETECTION IS PRIORITIZED) | × | ○ | ○ | ○ | × |

IMAGE PROCESSING APPARATUS, IMAGE PROCESSING METHOD, AND PROGRAM

TECHNICAL FIELD

The present technology relates to an image processing apparatus, an image processing method, and a program and aims at generating aberration information if necessary.

BACKGROUND ART

In the past, some image processing apparatuses have performed an aberration correction by performing signal processing on an image signal. In PTL 1, for example, characteristics regarding an aberration are detected from photographed images. Further, information regarding the aberration is generated on the basis of the characteristics and the aberration of an imaging optical system is corrected on the basis of the generated information. Further, in the image processing apparatus, for example, as disclosed in PTL 2, the aberration correction is performed on the basis of the information regarding the aberration.

CITATION LIST

Patent Literature

[PTL 1]
   JP 2012-198273A
[PTL 2]
   JP 2011-223217A

SUMMARY

Technical Problem

Meanwhile, in a case where processing of detecting the characteristics regarding the aberration from the photographed image and generating the information is performed, a time for the detection of the characteristics regarding the aberration or the generation of information for correcting the aberration is required.

Thus, an object of the present technology is to provide an image processing apparatus, image processing method, and program for reducing a possibility that an opportunity of performing photographing by the user is lost by waiting for the detection of the characteristics regarding the aberration or the generation of the information for correcting the aberration.

Solution to Problem

According to a first aspect of the present technology, there is provided an image processing apparatus including a control section configured to determine that it is necessary to generate detection aberration information for correcting an aberration of a captured image in a case where it is determined that retention aberration information is unreliable.

In the present technology, the control section determines the reliability of the retention aberration information. The control section determines the reliability of the retention aberration information, for example, by using at least any one of imaging setting information regarding imaging setting, captured image calculation information calculated by using the captured image, or the metadata (attribute information) of the retention aberration information. The control section, in a case where it is determined that the retention aberration information is unreliable, determines that it is necessary to generate the detection aberration information. In a case where it is determined by the control section that it is necessary to generate the detection aberration information, a lens aberration detection processing section performs an aberration detection by using the captured image and generates the detection aberration information. The control section sets the generated detection aberration information as application aberration information associated with the captured image. Further, the control section updates the retention aberration information by using the generated detection aberration information. The control section, in a case where it is determined that the retention aberration information is reliable, sets the retention aberration information as the application aberration information.

A lens aberration correction processing section performs aberration correction processing of the captured image by using the application aberration information. An association section associates the application aberration information with the captured image. Further, the control section, in a case where an operation mode is an imaging mode in which an imaging interval is shorter than a predetermined value, sets the retention aberration information as the application aberration information. The retention aberration information is information regarding a lens aberration occurred in an imaging optical system of an interchangeable lens.

The control section, in a case where the interchangeable lens is mounted, determines reliability of the retention aberration information. Further, the control section uses aberration information retained in the interchangeable lens as the retention aberration information. Further, the control section updates the aberration information retained in the interchangeable lens by using the detection aberration information generated by the lens aberration detection processing section. The control section, in a case where the aberration information cannot be acquired from the interchangeable lens, sets the aberration information retained in the image processing apparatus as the retention aberration information. The control section determines the reliability of the retention aberration information by using a mounting detection result of the interchangeable lens. Further, the control section determines the reliability of the retention aberration information by using simple aberration information detected by simple aberration detection processing that is simpler than the aberration detection processing.

The control section, in a case where an index indicating the reliability is smaller than a first determination threshold value, determines that the retention aberration information is unreliable, in a case where the index is greater than or equal to the first determination threshold value and is smaller than or equal to a second determination threshold value that is greater than the first determination threshold value, sets the simple aberration information as the application aberration information used for an aberration correction, and in a case where the index is greater than the second determination threshold value, sets the retention aberration information as the application aberration information.

According to a second aspect of the present technology, there is provided an image processing method including determining that it is necessary to generate detection aberration correction information for correcting an aberration of a captured image in a case where it is determined by a control section that performs aberration correction control of the captured image that retention aberration information is unreliable.

According to a third aspect of the present technology, there is provided a program for causing a computer to execute aberration correction control of a captured image and to implement a reliability determination function configured to determine reliability of retention aberration information; and an aberration information generation determination function configured to determine that it is necessary to generate detection aberration information for correcting an aberration of the captured image in a case where it is determined by the reliability determination function that the retention aberration information is unreliable.

Note that the program of the present technology includes, for example, a program that can be provided through a storage medium or a communication medium that is provided in a computer-readable format to a general-use computer that can execute a variety of program codes, for example, the storage medium including an optical disk, a magnetic disk, a semiconductor memory, etc. or the program being providable by a communication medium such as a network. By providing such a program in a computer-readable format, processing corresponding to the program is performed on the computer.

Advantageous Effects of Invention

According to the present technology, in a case where it is determined that retention aberration information is unreliable, it is determined that it is necessary to generate detection aberration information for correcting an aberration of a captured image. Therefore, because aberration information is generated only in a necessary case, a possibility that an opportunity of performing photographing by the user is lost can be reduced. Note that effects described in the present specification are merely illustrative and are not limitative, and additional effects may be exhibited.

BRIEF DESCRIPTION OF DRAWINGS

FIG. 2 is a diagram exemplifying a configuration of a reliability determination section.

FIG. 3 is a diagram exemplifying an aberration to be corrected and processing regarding the aberration.

FIG. 4 is a diagram illustrating a relationship between a reliability determination and application aberration information.

FIG. 6 is a diagram illustrating information indicating the weighting in accordance with a retention situation of retention aberration information.

DESCRIPTION OF EMBODIMENTS

Hereinafter, modes for carrying out the present technology will be described. Note that the description will be made in the following order.

1. Configuration of Image Processing Apparatus
2. Configuration of Reliability Determination Section
3. Regarding Aberration to be Corrected
4. Action of Image Processing Apparatus
5. Other Modes of Reliability Determination
6. Regarding Simple Detection Processing <1. Configuration of Image Processing Apparatus>

Figure 1:
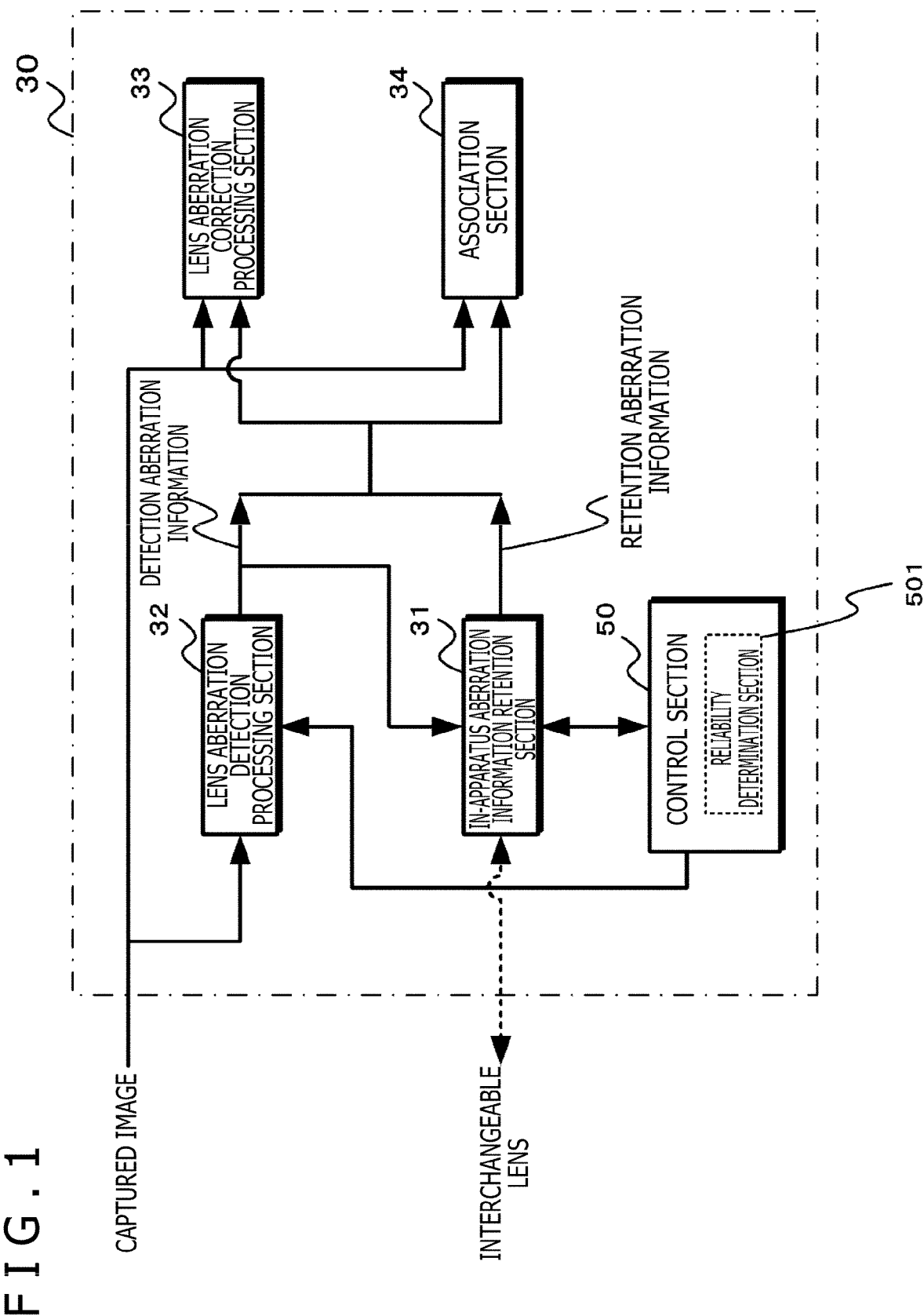
FIG. 1 is a diagram exemplifying a configuration of an image processing apparatus.

FIG. 1 exemplifies a configuration of an image processing apparatus of the present technology. An image processing apparatus 30 includes an in-apparatus aberration information retention section 31, a lens aberration detection processing section 32, a lens aberration correction processing section 33, an association section 34, and a control section 50. Note that the image processing apparatus may be an imaging apparatus including an imaging section and the like (not illustrated). Further, the image processing apparatus and the imaging apparatus including an imaging device may be configured as separate chassis. The image processing apparatus may have a configuration in which a captured image is received from the imaging apparatus through wireless or wired communication.

The in-apparatus aberration information retention section 31 of the image processing apparatus 30 retains aberration information regarding a lens aberration. The aberration information may be either of aberration amount information indicating the aberration amount itself and an aberration correction parameter for correcting the lens aberration. Here, in a case of the aberration correction parameter, an aberration correction is performed by using the aberration correction parameter. Further, in a case of the aberration amount information, the aberration correction parameter is generated from the aberration amount information at a stage for performing the aberration correction or the like and the aberration correction is performed. Note that, in the following descriptions, the aberration information retained in the in-apparatus aberration information retention section 31 is defined as retention aberration information. The in-apparatus aberration information retention section 31 performs an output, updating, or the like of the retention aberration information on the basis of a control signal from the control section 50. In addition, an updating of the retention aberration information is not limited to an automatic updating, a user is persuaded to update the retention aberration information by using a display or voices, and the updating may be performed in accordance with a user operation.

The lens aberration detection processing section 32 detects an aberration occurred in an imaging optical system and generates detection aberration information for correcting the aberration of the captured image by using an image signal of the captured image generated by the imaging section provided on the imaging apparatus on the basis of the control signal from the control section 50.

The lens aberration correction processing section 33 performs aberration correction processing of the captured image by using, as application aberration information, the retention aberration information retained in the in-apparatus aberration information retention section 31 or the aberration information generated by performing an aberration detection by the lens aberration detection processing section 32, etc. Note that the captured image as an object of the aberration correction processing just has to include a record or an image to be transferred to other equipment. Further, the aberration correction may not be performed to an image, a through image, or the like used for the aberration detection, etc.

The association section 34 associates the application aberration information with the captured image. Through the association, in a case where the aberration correction processing of the captured image is further performed, the application aberration information can be used. For example, the application aberration information is given as metadata (tag information) to image data of the captured image recorded on a recording medium in the form of an Exif (Exchangeable image file format) to thereby associate the application aberration information with the captured image. Further, the association section 34 sets the application aberration information as the metadata (attribute information) of the image data to, for example, the image data of the captured image transmitted to an external equipment via a wireless or wired transmission path to thereby associate the application aberration information with the captured image. Note that, the image data may be uncompressed data including luminance data in which development processing is performed on RAW data and color-difference data, or compressed data that is compressed to the uncompressed data by JPEG, etc. or the RAW data and the compressed data of the RAW data. As described above, the association section 34 associates the application aberration information with the captured image. Thereby, in an external equipment (e.g., a computer apparatus) outside the image processing apparatus (outside the imaging apparatus), the aberration correction processing is performed on the captured image received from the image processing apparatus or on the captured image recorded on a recording medium such as a removable memory card. Alternatively, in the image processing apparatus, the aberration correction is performed by the lens aberration correction processing section 33 with respect to the captured image before the aberration correction recorded on the recording medium at the time of reproduction. In the above cases, the application aberration information associated with the captured image is used to thereby correct the aberration occurred in the captured image appropriately.

The control section 50 has a CPU (Central Processing Unit), a ROM (Read Only Memory), a RAM (Random Access Memory), and the like. The ROM (Read Only Memory) stores various programs to be executed by the CPU (Central Processing Unit). The RAM (Random Access Memory) stores information regarding various parameters, etc. The CPU executes various programs stored in the ROM.

To appropriately correct the aberration of the captured image, the control section 50 further has a reliability determination section 501 that performs a reliability determination of the retention aberration information retained in the in-apparatus aberration information retention section 31.

In a case where it is determined by the reliability determination section 501 that the retention aberration information is unreliable, the control section 50 determines that it is necessary to generate the detection aberration information for correcting the aberration of the captured image. Further, in a case where it is determined that it is necessary to generate the detection aberration information, the control section 50 controls the lens aberration detection processing section 32 to perform aberration detection processing by using the captured image and generate the detection aberration information. Further, the control section 50 allows the lens aberration detection processing section 32 to output, as the application aberration information, the detection aberration information generated by the lens aberration detection processing section 32 to the lens aberration correction processing section 33 or the association section 34. In addition, the control section 50 outputs the detection aberration information to the in-apparatus aberration information retention section 31 and updates the retention aberration information retained in the in-apparatus aberration information retention section 31.

In a case where it is determined by the reliability determination section 501 that the retention aberration information is reliable, the control section 50 allows the in-apparatus aberration information retention section 31 to output, as the application aberration information, the retention aberration information retained in the in-apparatus aberration information retention section 31 to the lens aberration correction processing section 33 or the association section 34.

An interchangeable lens is used by the imaging apparatus to which the image processing apparatus according to the present technology is applied, the aberration information is retained in the mounted interchangeable lens, and the imaging apparatus can acquire in-lens aberration information from the interchangeable lens. In this case, the image processing apparatus 30 acquires the aberration information (in-lens aberration information) retained in the interchangeable lens from the interchangeable lens. Further, the image processing apparatus 30 stores, as the retention aberration information, the aberration information in the in-apparatus aberration information retention section 31 and performs the reliability determination of the retention aberration information. Further, in a case where the retention aberration information is unreliable and the in-lens aberration information can be updated, the image processing apparatus 30 communicates with the interchangeable lens and thereby updates the in-lens aberration information by using the detection aberration information. Note that the updating of the in-lens aberration information may be performed in a case where a possibility of performing the next photographing is low at a power-off time, a reproduction time, or the like. It is impossible to acquire the in-lens aberration information from the interchangeable lens because the in-lens aberration information is not retained in the interchangeable lens or the like. In this case, the image processing apparatus 30 assumes that the retention aberration information retained in the in-apparatus aberration information retention section 31 is the aberration information corresponding to the mounted interchangeable lens and performs the reliability determination of the retained retention aberration information. Further, the retention aberration information may be retained in each interchangeable lens or in each kind/model of the interchangeable lens in the in-apparatus aberration information retention section 31. In this case, the retention aberration information corresponding to the mounted interchangeable lens is used in the retention aberration information retained in the in-apparatus aberration information retention section 31. Further, in a case where it is possible to acquire the in-lens aberration information from the mounted interchangeable lens, the image processing apparatus 30 determines whether or not the retention aberration information retained in the in-apparatus aberration information retention section 31 corresponding to the mounted interchangeable lens is matched with the in-lens aberration information acquired from the interchangeable lens. If it is not matched, the image processing apparatus 30 may determine that there is a possibility that the in-lens aberration information and the retention aberration information are unreliable and perform the reliability determination. Further, in a case where the retention aberration information is unreliable, the image processing apparatus 30 updates the retention aberration information retained in the in-apparatus aberration information retention section 31 by using the detection aberration information as described above. Further, the image processing apparatus 30 may update the in-lens aberration information retained in the interchangeable lens.

<2. Configuration of Reliability Determination Section>

FIG. 2 exemplifies a configuration of the reliability determination section that performs the reliability determination of the retention aberration information. The reliability determination section 501 calculates an index indicating the reliability of the retention aberration information, for example, a degree of reliability. The degree of reliability is calculated by using at least any one of imaging setting information regarding image setting, captured image calculation information calculated by using the captured image, or metadata (attribute information) of the retention aberration information. The reliability determination section 501 determines the reliability of the retention aberration information on the basis of the calculated degree of reliability. The reliability determination section 501 has scoring processing sections 5011 to 5013, 5015, and 5017 that calculate the degree of reliability of the retention aberration information, an image difference calculation section 5014, a simple aberration detection processing section 5016, and a determination processing section 5019 that determines the reliability of the retention aberration information on the basis of the calculated degree of reliability.

The scoring processing sections 5011 to 5013 perform scoring processing on the basis of the imaging setting information regarding the imaging setting. Here, in the present embodiment, a high value in which the retention aberration information is thought to be able to be trusted and the aberration is thought to be able to be accurately corrected by using the retention aberration information is assumed to be given to the score. For example, it is assumed that in a case where the elapsed time is short from the previous imaging time, there is no change in a setting state of the lens and also there is no change in the aberration. Accordingly, the scoring processing section 5011 performs the scoring processing of an elapsed time determination result as the scoring processing based on the imaging setting information, namely, a determination result indicating the elapsed time from the previous photographing time. Further, the scoring processing section 5011 makes the scoring value greater as the elapsed time from the previous photographing time is shorter. For example, in a case where an imaging interval is short like rapid shooting, the scoring processing section 5011 makes the scoring value great. By contrast, as the imaging interval is longer at a non-rapid shooting time, the scoring processing section 5011 makes the scoring value smaller. The scoring processing section 5011 outputs the scoring value to the determination processing section 5019 on the basis of the imaging interval determination result as one of the elapsed time determination results.

Further, in a case where a lens interchange (mounting) is performed, a lens after the interchange (mounting) is assumed to be different from a lens before the interchange. That is, because the interchangeable lens is different from the lens at the previous imaging time, the aberration is assumed to be different. Accordingly, the scoring processing section 5012 performs the scoring processing of a lens interchange (mounting) detection result as the scoring processing based on the imaging setting information. In a case where the lens interchange (mounting) is performed, the scoring processing section 5012 makes the scoring value small as compared to a case in which the interchange (mounting) is not performed. The scoring processing section 5012 outputs the scoring value based on the lens interchange (mounting) detection result to the determination processing section 5019.

Further, in a case where a manual focus operation, a zooming operation, an autofocusing action, or the like is performed, the aberration is assumed to be changed in accordance with an operation amount or an action amount. Accordingly, the scoring processing section 5013 performs scoring processing of a setting state detection result of the interchangeable lens as the scoring processing based on the imaging setting information. Further, as a change in the setting state is greater, the scoring processing section 5013 makes the scoring value smaller. The scoring processing section 5013 outputs the scoring value based on the setting state detection result to the determination processing section 5019.

The scoring processing sections 5015 and 5017 perform the scoring processing of the captured image calculation information calculated by using the captured image. For example, in a case where a difference between the captured image to be corrected and the previous captured image captured before the captured image to be corrected, namely, the most recently recorded captured image is small, it is assumed that a change in the setting state of the interchangeable lens is small and a change in the aberration is also small. Accordingly, the image difference calculation section 5014 calculates an image difference by using the captured image to be corrected and the previous captured image and outputs the image difference to the scoring processing section 5015. For example, a sum of absolute values of a pixel value difference in each pixel may be used with respect to the image difference between the captured image to be corrected and the previous captured image. Further, a difference, etc. between distributions of frequency components or image characteristic points may be used as the image difference. The scoring processing section 5015 performs the scoring processing of the image difference calculation result as the scoring processing of the captured image calculation information. Further, as the image difference becomes greater, the scoring processing section 5015 makes the scoring value smaller.

The simple aberration detection processing section 5016 performs simple detection processing that is simpler than the aberration detection processing in a case where the detection aberration information is generated by using the lens aberration detection processing section 32. Further, the simple aberration detection processing section 5016 generates the simple aberration information and outputs the simple aberration information to the scoring processing section 5017. Note that the simple detection processing will be described in an item of <6. Regarding Simple Detection Processing>. The lens aberration detection processing section 32 performs the aberration detection processing, and therefore when the simple detection processing is performed by using the lens aberration detection processing section 32, the lens aberration detection processing section 32 can be used as the simple aberration detection processing section 5016 and the simple aberration detection processing section 5016 can be eliminated.

The scoring processing section 5017 performs the scoring processing as a difference between the retention aberration information and the simple aberration information as the scoring processing of the captured image calculation information. Further, as the difference becomes greater, the scoring processing section 5017 makes the scoring value smaller.

The determination processing section 5019 determines the reliability by using the scoring value provided from the scoring processing sections 5011 to 5013, 5015, and 5017.

The determination processing section 5019 determines the reliability by using a total of the scoring values (total score value). In a case where it is determined that there is the reliability, the determination processing section 5019 sets the retention aberration information as the application aberration information. Further, the determination processing section 5019 generates a control signal specifying that the retention aberration information is used as the application aberration information. By contrast, in a case where it is determined that there is no reliability, the determination processing section 5019 sets the detection aberration information as the application aberration information. Further, the determination processing section 5019 generates the control signal specifying that the detection aberration information is generated by using the lens aberration detection processing section 32. In the determination of the reliability using the total score value, for example, the total score value is compared with a previously set threshold value. When the total score value is greater than or equal to the threshold value, the determination processing section 5019 determines that there is the reliability. By contrast, when the total score value is smaller than the threshold value, the determination processing section 5019 determines that there is no reliability.

Further, the control section 50 may set the retention aberration information as the application aberration information in accordance with an imaging mode in which an imaging interval is short and it is difficult to perform the aberration detection by using the lens aberration detection processing section 32 in each captured image. For example, when it is difficult to perform the aberration detection processing in each frame because the captured image is a moving image, the control section 50 may use the retention aberration information as the application aberration information. Further, in a case where the imaging mode is a moving image mode and the moving image mode has a frame rate that is higher than a predetermined frame rate, the control section 50 may use the retention aberration information as the application aberration information.

The determination processing section 5019 outputs the generated control signal to the in-apparatus aberration information retention section 31 and the lens aberration detection processing section 32.

Further, a configuration of the reliability determination section is not limited to the above-described configuration. The reliability determination section 501 may determine the reliability by using processing results of a portion of the scoring processing sections. For example, the reliability determination section 501 may determine the reliability without performing the simple detection processing.

Further, regardless of a case in which the scoring processing of the imaging setting information and the captured image calculation information is performed, the reliability determination section 501 may determine the reliability by using the imaging setting information and captured image calculation information themselves. For example, in a case where the lens interchange (mounting) is performed or a lens operation of the user is performed, the reliability determination section 501 may determine that there is no reliability without performing the scoring processing.

Further, the reliability determination section 501 may determine the reliability on the basis of the attribute information (metadata) of the retention aberration information. As the attribute information of the retention aberration information, for example, the reliability determination section 501 uses date and time information (e.g., detection date and time, update date and time, etc. of the retention aberration information) that is time information or version information, etc. capable of determining an aberration detection algorithm used for generation of the retention aberration information. In this case, the scoring processing section 5018 is provided on the reliability determination section 501. On the basis of the attribute information (metadata) of the retention aberration information, for example, the scoring processing section 5018 makes the scoring value smaller or the reliability lower as the elapsed time from date and time indicated by the attribute information of the retention aberration information is longer. Alternatively, in some cases, the elapsed time exceeds a previously set time or it is obvious that the version is old and latest aberration detection algorithm, etc. is not used in the retention aberration information. In this case, the scoring processing section 5018 may make the scoring value smaller so that it is determined that there is no reliability.

As described above, in a case where it is determined that the retention aberration information is unreliable, the control section 50 determines that it is necessary to generate the application aberration information for correcting an aberration of the captured image. Further, immediately after the determination of the reliability or in a case where predetermined conditions are satisfied after the determination, the control section 50 allows the lens aberration detection processing section 32 to perform the aberration detection processing and generate the detection aberration information by using the captured image. Further, the control section 50 updates the retention aberration information by using the generated detection aberration information. Further, in a case where it is determined that the retention aberration information is reliable, the control section 50 uses the retention aberration information as the application aberration information.

<3. Regarding Aberration to be Corrected>

FIG. 3 exemplifies an aberration to be corrected by the image processing apparatus and processing regarding the aberration. The image processing apparatus 30 sets, for example, at least any one of a chromatic aberration, purple fringe, or an astigmatism as the aberration to be corrected.

The chromatic aberration includes a magnification chromatic aberration in which a size of an image is different in each color and a color shift occurs due to a difference of a refractive index of each color and an axial chromatic aberration in which a color shift occurs backward and forward in the axial direction by a color of an image location due to a difference of a refractive index of each color.

In the magnification chromatic aberration, an influence of the aberration is significant in a portion close to the vicinity of an image. The lens aberration detection processing section 32 performs, for example, processing of block matching, etc. by using an image signal for each color. Further, the lens aberration detection processing section 32 detects, for example, a shift in a space phase of a red color component or blue color component to a green color component in an edge portion of a photographic object. Further, the lens aberration detection processing section 32 performs determination of a characteristic area in which an aberration is conspicuous on the basis of a phase shift. Further, the lens aberration detection processing section 32 determines an area of the phase shift that exceeds a previously set threshold value to be a characteristic area of the magnification chromatic aberration. The lens aberration correction processing section 33 performs the aberration correction processing on the basis of the application aberration information. Further, the lens aberration correction processing section 33 corrects, for example, a color shift by using the same method as that of JP 2012-15781A with respect to the characteristic area of the magnification chromatic aberration.

In the axial chromatic aberration, an influence of the aberration is conspicuous in a contour, etc. of a point source (so-called ball blur) in which circular blur occurs. The lens aberration detection processing section 32 generates a color-difference signal from an image signal for each color. The lens aberration detection processing section 32 determines an area in which a hue represented by a color-difference signal is matched with a typical axial chromatic aberration and further an area width in which undershoots or overshoots of the color-difference signal occur exceeds a previously set threshold value to be a characteristic area of the axial chromatic aberration. The lens aberration correction processing section 33 performs the aberration correction processing of the captured image on the basis of the application aberration information. Further, the lens aberration correction processing section 33 replaces a color signal in the characteristic area of the axial chromatic aberration with a peripheral color signal and corrects a color shift.

The purple fringe is a phenomenon in which a false color of purple or magenta is generated in a low-luminance area adjacent to a high-luminance area and an influence of the aberration is conspicuous in a high-contrast edge portion. On the basis of the image signal, the lens aberration detection processing section 32 determines an area in which an area width in which a false color occurs in a low-luminance area exceeds a previously set threshold value to be the characteristic area of the purple fringe. The lens aberration correction processing section 33 performs the aberration correction processing on the basis of the application aberration information. Further, the lens aberration correction processing section 33 replaces a color signal in the characteristic area (range of an area width in which a false color occurs) that is purple on the contour periphery of a high-contrast low-luminance area with a peripheral color signal to correct a color shift.

The astigmatism is an aberration in which refraction in the vertical direction of a lens differs from that in the horizontal direction and thereby that occurs. Further, an influence of the aberration is conspicuous in a luminescent spot such as stars of the night sky. The lens aberration detection processing section 32 determines the characteristic area on the basis of a point spread characteristic in each image height. The lens aberration correction processing section 33 performs the aberration correction processing on the basis of the application aberration information. Further, the lens aberration correction processing section 33 performs filter processing by a characteristic opposite to the point spread characteristic to the characteristic area and corrects a color shift.

<4. Action of Image Processing Apparatus>

FIG. 4 is a diagram describing actions of the image processing apparatus and illustrates a relationship between the reliability determination and the application aberration information. Also, (a) of FIG. 4 exemplifies a case in which the simple detection processing of the lens aberration is not included in the processing of the reliability determination section 501. Also, (b) of FIG. 4 exemplifies a case in which the simple detection processing is included in the processing of the reliability determination section 501 and the simple aberration information is set as the application aberration information. Also, (c) of FIG. 4 exemplifies a case in which the simple detection processing is included in the processing of the reliability determination section 501 and the simple aberration information is not set as the application aberration information.

The reliability determination section 501 of the control section 50 compares the total score value with the previously set determination threshold value and performs the reliability determination by using, for example, the total score value calculated by the scoring processing of the imaging setting information and the captured image calculation information as the degree of reliability that is an index indicating the reliability of the retention aberration information.

In a case where the simple detection processing is not included in the processing of the reliability determination section 501, as exemplified in (a) of FIG. 4, in a case where the total score value is smaller than the determination threshold value Tha, the reliability determination section 501 determines that there is no reliability. The lens aberration detection processing section 32 performs the aberration detection processing, generates the detection aberration information, and sets the generated detection aberration information as the application aberration information. Note that, in this case, the lens aberration detection processing section 32 may perform either processing of the aberration detection processing and the simple detection processing depicted in the present embodiment. Further, the lens aberration detection processing section 32 may perform processing that is simpler than the aberration detection processing depicted in the present embodiment and is more complicated than the simple detection processing or the aberration detection processing that is more complicated than the aberration detection processing depicted in the present embodiment. Further, in a case where the total score value is greater than or equal to the determination threshold value Tha, it is assumed that the reliability determination section 501 determines that the retention aberration information is reliable and the aberration detection processing is not performed by using the lens aberration detection processing section 32. In this case, it is determined that the retention aberration information is reliable and therefore the control section 50 sets the retention aberration information as the application aberration information.

In a case where the simple detection processing is included in the processing of the reliability determination section 501, as exemplified in (b) of FIG. 4, in a case where the total score value is smaller than the determination threshold value Th1, the reliability determination section 501 determines that there is no reliability. The lens aberration detection processing section 32 performs the aberration detection processing, generates the detection aberration information, and sets the generated detection aberration information as the application aberration information. Further, in a case where the total score value is greater than or equal to the determination threshold value Th1 and is smaller than a determination threshold value Th2 that is greater than the determination threshold value Th1, the reliability determination section 501 determines that there is the reliability and the reliability is moderate. Further, the aberration detection processing is not performed by using the lens aberration detection processing section 32 and the simple aberration information generated by the simple detection processing is set as the detection aberration information. Further, in a case where the total score value is greater than the determination threshold value Th2, the reliability determination section 501 determines that there is sufficiently the reliability. Further, the aberration detection processing is not performed by using the lens aberration detection processing section 32 and the retention aberration information in which it is determined that there is the reliability is set as the application aberration information.

In a case where the simple detection processing is included in the processing of the reliability determination section 501, the processing exemplified in (c) of FIG. 4 may be performed. Specifically, in a case where the total score value is smaller than the determination threshold value Thb, the reliability determination section 501 determines that there is no reliability. Further, the lens aberration detection processing section 32 performs the aberration detection processing, generates the detection aberration information, and sets the generated detection aberration information as the application aberration information. Further, in a case where the total score value is greater than or equal to the determination threshold value Thb, the reliability determination section 501 determines that there is sufficiently the reliability. Further, the aberration detection processing is not performed by using the lens aberration detection processing section 32 and the retention aberration information in which it is determined that there is the reliability is set as the application aberration information.

Figure 5:
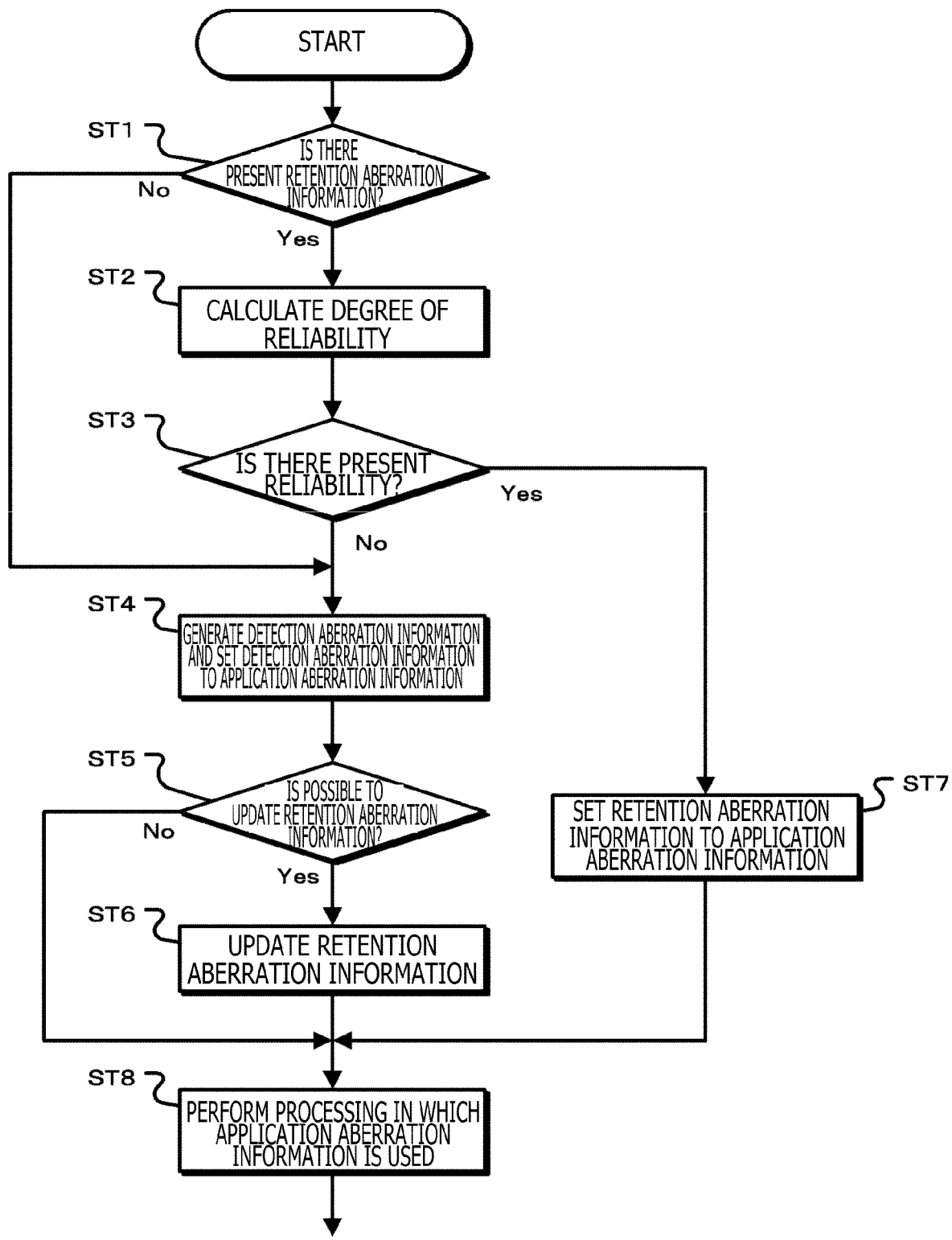
FIG. 5 is a flowchart exemplifying actions of a control section of the image processing apparatus.

FIG. 5 is a flowchart exemplifying actions of the control section of the image processing apparatus (imaging apparatus). Note that, when it is determined that it is necessary to determine the reliability of the retention aberration information, the control section may perform the processing of the flowchart exemplified in FIG. 5.

Determination of whether or not it is necessary to determine the reliability of the retention aberration information may be performed in accordance with the user setting, characteristics of the interchangeable lens, utility of the acquired captured image, and the like. For example, in a case where the aberration correction processing is set so as not to be performed depending on the mode setting by the user, the control section 50 determines that it is unnecessary to control the aberration information in accordance with the reliability of the retention aberration information. Further, for example, in a case where it is indicated that the interchangeable lens is a lens (e.g., reflecting lens, etc.) in which no aberration occurs due to metadata, etc. retained in the interchangeable lens or the interchangeable lens is an interchangeable lens in which an optical characteristic is preferable and the aberration is an aberration that can be ignored approximately, the control section 50 may determine that it is unnecessary to control the aberration information in accordance with the reliability of the retention aberration information. Further, at a monitoring time at which a through image is displayed on the display section for a composition adjustment process, etc. at the imaging time but recording of the captured image is not performed or in a case where an image that is lower in the resolution than the captured image to be recorded, for example, a thumbnail image is generated, the control section 50 may determine that it is unnecessary to control the aberration information in accordance with the reliability of the retention aberration information. Further, for example, in a case where it is difficult to perform the aberration detection processing in each frame because the captured image is a moving image, the control section 50 may determine that it is unnecessary to determine the reliability of the retention aberration information. Also, in a case where resolution (image size) of recording or the captured image to be transmitted to other equipment is low and an influence of the aberration is small, the control section 50 may determine that it is unnecessary to determine the reliability.

Note that, control processing of the aberration information may be started at timing illustrated in any item below.
1. At the time of mounting the interchangeable lens
2. Immediately after power-on
3. At the time when power-off operation is detected
4. At the time of moving from a photographing mode to other modes
5. For each imaging recording action
6. For each series of photographing action
7. At regular time intervals In step ST1 illustrated in FIG. 5, the control section determines whether or not there is the retention aberration information. If the retention aberration information is present in the in-apparatus aberration information retention section 31, the control section 50 proceeds to step ST2. By contrast, if there is no retention aberration information, the control section 50 proceeds to step ST4.

In step ST2, the control section calculates the degree of reliability. As described above, the control section 50 calculates, for example, the total score value as the degree of reliability of the retention aberration information. Further, in a case where the reliability determination is performed by using the simple aberration information, the control section 50 performs the simple detection processing and then calculates the degree of reliability of the retention aberration information. The control section 50 calculates the degree of reliability of the retention aberration information and proceeds to step ST3.

In step ST3, the control section determines whether or not there is the reliability. The control section 50 compares, for example, the total score value with the determination threshold value and determines whether or not there is present the reliability of the retention aberration information. If it is determined that there is no reliability, the control section 50 sets (selects) the detection aberration information as the application aberration information and then proceeds to step ST4. If it is determined that there is the reliability, the control section 50 proceeds to step ST7.

In step ST4, the control section generates the detection aberration information and sets (selects) the detection aberration information as the application aberration information. The control section 50 allows the lens aberration detection processing section 32 to perform the aberration detection processing and generate the detection aberration information. Further, the control section 50 sets the generated detection aberration information as the application aberration information and proceeds to step ST5. The processing of step ST4 is not limited to a case in which it is performed immediately after the processing of step ST3. Further, the processing may be started in accordance with the fact that aberration detection start conditions are satisfied such as after a single or a series of photographing ends or in a case where power-off is instructed. That is, a stage in which the aberration corresponding to the captured image can be detected is preferable.

In step ST5, the control section determines whether it is possible to update the retention aberration information. If it is possible to update the retention aberration information retained in the in-apparatus aberration information retention section 31, the control section 50 proceeds to step ST6. By contrast, in a case where the in-apparatus aberration information retention section 31 is composed of non-rewritable memories or rewriting is inhibited by user setting or the like, the control section 50 determines that it is impossible to update the retention aberration information and proceeds to step ST8.

In step ST6, the control section performs updating of the retention aberration information. The control section 50 updates the retention aberration information by using the detection aberration correction information generated in step ST4. For example, the control section 50 sets the detection aberration information as a new retention aberration information. Updating of the in-lens aberration information may be performed at timing in which an influence is not given to photographing, for example, a case in which a possibility of performing the next photographing is low such as at a power-off time or at a reproduction time. Further, the control section 50 may calculate an average value of the retention aberration information and the detection aberration information and set the average value as the new retention aberration information so that a change in the retention aberration information becomes smooth. Further, the control section 50 may perform weighting in accordance with the total score value calculated in step ST2. For example, the control section 50 calculates a weighting average value of the retention aberration information and the detection aberration information and sets the weighting average value as the new retention aberration information. In a calculation of the weighting average value, the control section 50 makes a weight of the retention aberration information greater as the total score value becomes greater. The control section 50 updates the retention aberration information and proceeds to step ST8. Note that the processes of step ST5 and step ST6 may not be performed.

When the process proceeds from step ST3 to step ST7, the control section sets the retention aberration information as the application aberration information. Because the retention aberration information is reliable, the control section 50 sets the retention aberration information as the application aberration information as exemplified in (a) of FIG. 4 or (c) of FIG. 4. Further, as exemplified in (b) of FIG. 4, on the basis of comparison results between the total score value and the determination threshold value Th2, in a case where the retention aberration information is reliable, the control section 50 may set the retention aberration information as the application aberration information. Further, in a case where the retention aberration information is reliable and moderate, the control section 50 may set the simple aberration information as the application aberration information. The control section 50 sets the retention aberration information as the application aberration information and proceeds to step ST8.

In step ST8, the control section performs processing by using the application aberration information. For example, the control section 50 controls the lens aberration correction processing section 33 and performs the aberration correction processing of the captured image to correct the aberration occurred in the captured image on the basis of the application aberration information. Note that, the processing is not limited to a case in which it is performed immediately after the process of step ST6 or step ST7. Further, the processing may be performed at any timing except timing at which the user desires to perform photographing immediately such as at a movement time to the reproduction mode or at a power-off time.

Further, for example, the control section 50 controls the association section 34 to associate the application aberration information with the captured image. Through the above, the processes of steps from ST1 to ST6 and ST8 end once within the image processing apparatus (imaging apparatus). Then, in a case where the aberration correction processing is performed at the interval of the time once such as at the reproduction time in the image processing apparatus (imaging apparatus) or in a case where the aberration correction processing of the captured image is performed in an external equipment, etc., the control section 50 may correct the aberration occurred in the captured image by using the associated application aberration information.

As described above, in the image processing apparatus, in a case where it is determined that the retention aberration information is unreliable, it is determined that it is necessary to generate the detection aberration information for correcting the aberration of the captured image. Further, in a case where it is determined that it is necessary to generate the detection aberration information, the aberration detection is performed by using the captured image and the detection aberration information is generated. Therefore, it is possible to generate the aberration information, if necessary, and it is possible to satisfy both accuracy of the aberration correction and efficiency of the processing in the image processing apparatus (imaging apparatus).

<5. Other Modes of Reliability Determination>

Next, other modes of the reliability determination will be described. In the other modes, the weighting of the information used for the reliability determination is performed, and thereby the application aberration information can be used in accordance with imaging conditions.

FIG. 6 illustrates information indicating the weighting in accordance with the retention situation of the retention aberration information in the information used for the reliability determination. A circle mark represents information in which the weighting is desired to be heightened and a cross mark represents information that is not related to the weighting.

For example, in a case where the in-lens aberration information is retained in the interchangeable lens, the image processing apparatus can acquire the aberration information corresponding to the interchangeable lens. Here, when the characteristics are changed due to aged deterioration of the interchangeable lens, the lens aberration correction processing section may not correct the aberration of the captured image accurately even if using the in-lens aberration information. Accordingly, the control section makes the weighting of detection results regarding the aged deterioration great. Further, for example, in a case where an external component of an optical filter is used, the optical characteristics are changed due to the optical filter. As a result, there occurs a possibility that the aberration of the captured image is not accurately corrected even if the lens aberration correction processing section 33 uses the in-lens aberration information. To solve the above problem, the control section makes the weighting of the detection results regarding the simple detection great. Note that in a case where the previous captured image and the image are the same, the control section determines that the external component, etc. of the optical filter is not used. Therefore, it is possible for the control section to use comparison results of the image. Therefore, the control section may make the weighting of the detection results regarding the image comparison great.

In a case where the in-lens aberration information is not retained in the interchangeable lens, the weighting may be performed while giving priority to a simple detection result. Further, detection results of an interchange detection or setting state detection may be prioritized and the weighting may be performed.

In a case where priority is given to the simple detection result, it is possible for the control section to determine the reliability of the retention aberration information already generated by using the simple detection result. Therefore, the control section makes the weighting of the detection result regarding the simple detection great. Further, when the elapsed time is short from the previous imaging time, a change in a lens state is small and a change in the aberration can be ignored. Therefore, it is possible to skip the simple detection processing with respect to a second captured image or later at the time of rapid shooting.

In a case where the detection result of the interchange detection or setting state detection is prioritized, the control section makes the weighting of the detection result regarding the elapsed time, for example, that regarding the lens interchange great. Further, the control section makes the weighting of the detection result regarding the setting state detection, for example, that regarding a focus position, a zooming position, and aperture setting great.

Figure 7:
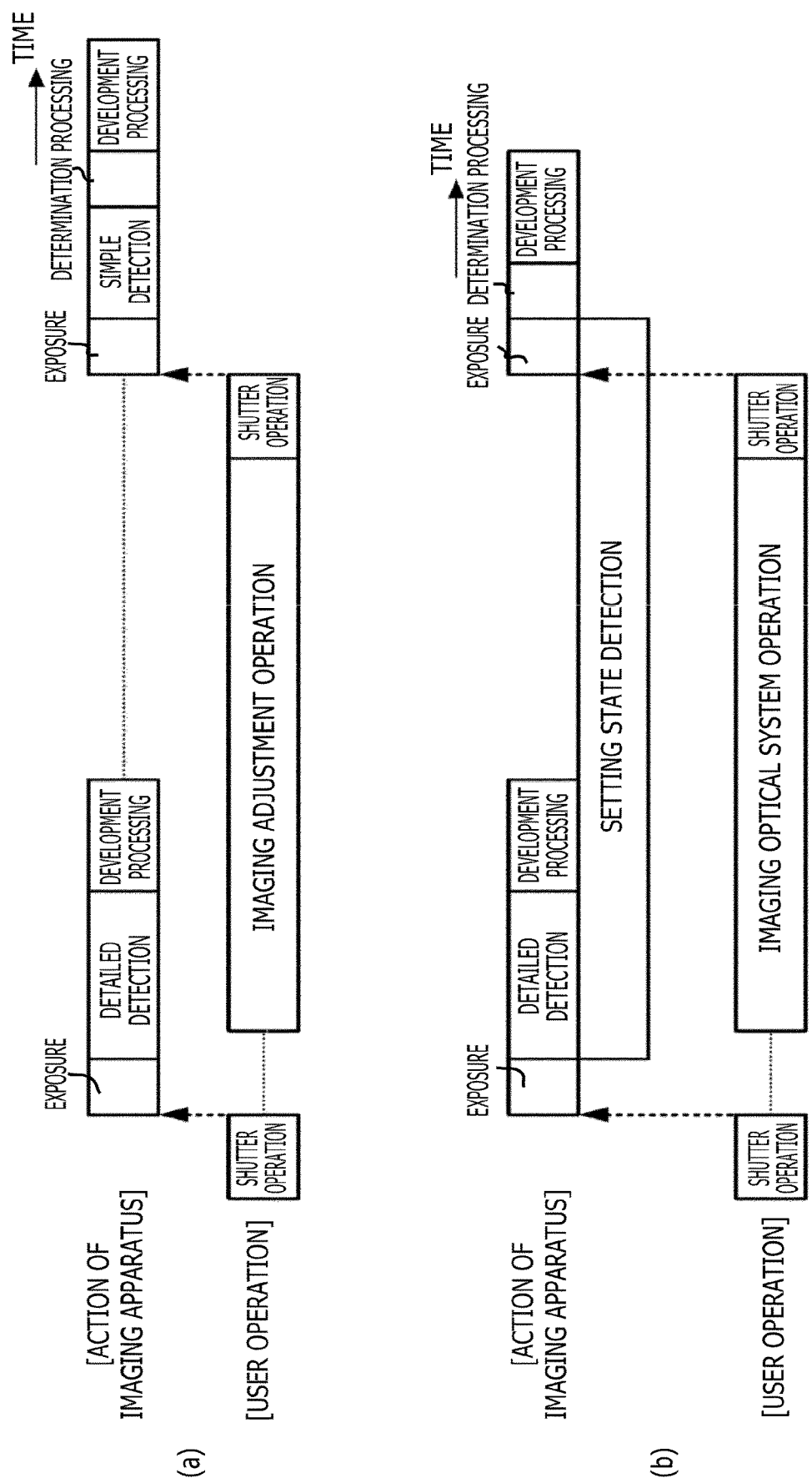
FIG. 7 is a diagram exemplifying actions in a case where information regarding simple detection processing is prioritized and information regarding setting state detection is prioritized.

In a case where there is no retention aberration information as an initial stage, FIG. 7 exemplifies actions in a case where information regarding the simple detection processing is prioritized and those in a case where information regarding the setting state detection is prioritized. Also, (a) of FIG. 7 illustrates the user operation and the actions of the image processing apparatus (imaging apparatus) according to the present technology in a case where the information regarding the simple detection processing is prioritized. Also, (b) of FIG. 7 illustrates the user operation and the actions of the image processing apparatus (imaging apparatus) according to the present technology in a case where the information regarding the setting state detection is prioritized.

In a case where priority is given to the information of the simple detection processing, as illustrated in (a) of FIG. 7, when the user performs a shutter operation, the imaging apparatus performs an exposure in accordance with the shutter operation of the user and generates the captured image. Further, the imaging apparatus performs the aberration detection processing by using the captured image and generates the detection aberration information. In addition, the imaging apparatus allows the interchangeable lens or the aberration information retention section of the imaging apparatus to store the generated detection aberration information as the retention aberration information.

After the shutter operation is performed, the user performs an imaging adjustment operation for performing the next imaging, for example, an adjustment of the focus position, zooming position, and aperture setting of the interchangeable lens. Further, the user completes the imaging adjustment operation, etc. and then performs the shutter operation.

The imaging apparatus performs an exposure in accordance with the shutter operation of the user and generates the captured image. Further, the imaging apparatus performs the simple detection processing because the retention aberration information is retained, and generates the simple detection aberration information. The imaging apparatus performs the reliability determination of the retention aberration information by using the simple detection aberration information generated by the simple detection processing. In a case where the retention aberration information is unreliable, the imaging apparatus performs the aberration detection processing and performs the aberration correction processing by using, as the application aberration information, the detection aberration information obtained by the aberration detection processing. By contrast, in a case where the retention aberration information is reliable, the imaging apparatus performs the aberration correction processing by using the retention aberration information as the application aberration information. Note that, in a case where the retention aberration information is unreliable, the imaging apparatus updates the retention aberration information by using the detection aberration information generated by the aberration detection processing.

In a case where the information regarding the setting state detection is prioritized, as illustrated in (b) of FIG. 7, when the user performs the shutter operation, the imaging apparatus performs an exposure in accordance with the shutter operation of the user and generates the captured image. Further, the imaging apparatus performs the aberration detection processing by using the captured image and performs the aberration correction processing by using, as the application aberration information, the detection aberration information obtained by the aberration detection processing. Further, the imaging apparatus allows the interchangeable lens or the imaging apparatus to store the generated detection aberration information as the retention aberration information. Further, after the generation of the captured image, the imaging apparatus performs the setting state detection processing and detects how the setting is changed by the user operation.

After the shutter operation is performed, the user performs the imaging adjustment operation for performing the next imaging, for example, an adjustment of the focus position, zooming position, and aperture setting of the interchangeable lens. Further, the user completes the imaging adjustment operation, etc. and then performs the shutter operation.

The imaging apparatus performs an exposure in accordance with the shutter operation of the user and generates the captured image. Further, because the retention aberration information is retained, the imaging apparatus performs the reliability determination of the retention aberration information by using the detection result of the setting state detection processing. In a case where it is determined that the retention aberration information is unreliable, the imaging apparatus performs the aberration detection processing. Further, the imaging apparatus performs the aberration correction processing by using, as the application aberration information, the detection aberration information obtained by the aberration detection processing. Further, in a case where the retention aberration information is reliable, the imaging apparatus performs the aberration correction processing by using the retention aberration information as the application aberration information. Note that, in a case where the retention aberration information is unreliable, the imaging apparatus updates the retention aberration information by using the detection aberration information generated by the aberration detection processing.

In a case where the information regarding the simple detection processing is prioritized, the control section determines the reliability by using the simple detection aberration information. Therefore, the control section can determine the reliability accurately as compared to a case in which the information regarding the setting state detection is prioritized. However, because the simple detection processing is performed, a development process is completed lately as compared to a case in which the information regarding the setting state detection is prioritized. Accordingly, the timing at which the next photographing can be performed becomes late.

Further, in a case where the information regarding the setting state detection is prioritized, the imaging is performed in the past and the retention aberration information is stored. In this case, because it is unnecessary to perform the aberration detection processing, the captured image in which the aberration is corrected can be output rapidly as compared to a case in which the information regarding the simple detection processing is prioritized. However, because the reliability is determined on the basis of the setting state in accordance with the user operation, there occurs a possibility that a determination accuracy of the reliability is reduced and the application aberration information is not the aberration information appropriate for the captured image as compared to a case in which the information regarding the simple detection processing is prioritized. In this case, there occurs a possibility that it is impossible to accurately perform the aberration correction similarly to a case in which the information regarding the simple detection processing is prioritized. Therefore, when the user can preferentially select either of the information regarding the simple detection processing and that regarding the setting state detection, an action desired by the user can be performed by using the imaging apparatus.

<6. Regarding Simple Detection Processing>

Next, the simple detection processing will be described. In the simple detection processing, even if highly accurate detection processing is not performed by using the captured image, the detection processing is performed so that the simple detection aberration information can be generated similarly to a case in which the highly accurate detection processing is performed.

Figure 8:
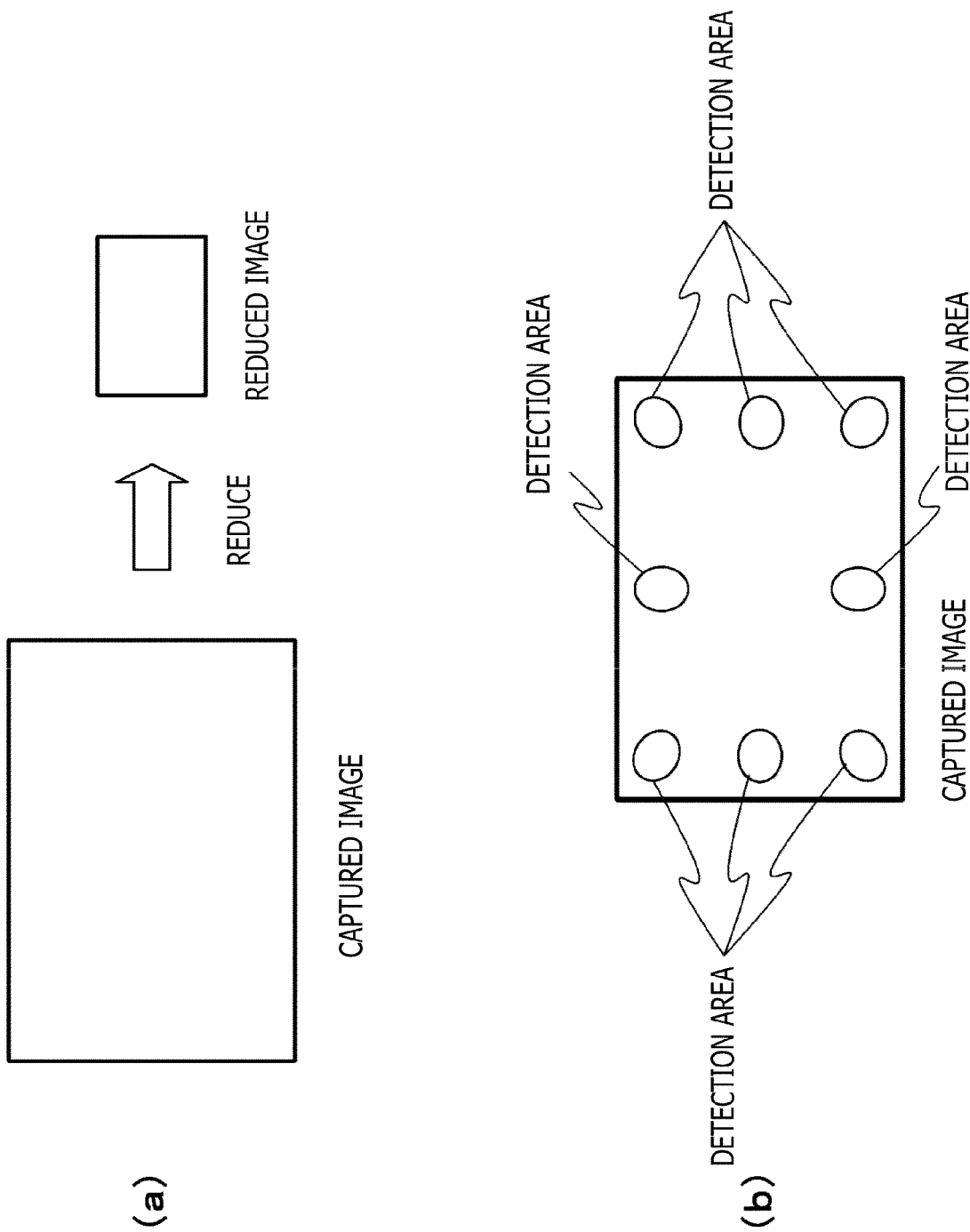
FIG. 8 is a diagram exemplifying a detection area of the simple detection processing.

FIG. 8 exemplifies the detection area of the simple detection processing. In a case where the simple detection processing is performed by using the lens aberration detection processing section 32, the lens aberration detection processing section 32 uses a reduced image obtained by reducing the captured image in the simple detection processing, for example, as illustrated in (a) of FIG. 8. In the reduced image, an image size is small as compared to the captured image before the reduction, and therefore the simple detection aberration information can be generated in a short time as compared to the detection processing in which the captured image before the reduction is used. Further, the lens aberration detection processing section 32 sets, as the detection area, for example, a portion of the image area in the captured image in the simple detection processing. In this case, because the detection area is small, the lens aberration detection processing section 32 can generate the simple detection aberration information in a short time as compared to a case in which the detection processing is performed without limiting the detection area. Further, in a case where an area is limited and the simple detection processing is performed, the lens aberration detection processing section 32 uses the characteristic area in which the aberration is conspicuous in the simple detection processing. For example, in a case where the magnification chromatic aberration is detected, as illustrated in (b) of FIG. 8, the lens aberration detection processing section 32 sets, as the detection area, an area in which an image height is higher than a predetermined rate. An effect of the aberration correction is great in the area in which an image height is high and therefore the area in which an image height is high is used as the characteristic area. When the simple detection processing is performed by using the characteristic area as the detection area, the magnification chromatic aberration can be effectively corrected. Further, the lens aberration detection processing section 32 may set, as the characteristic area, an area in which the image height is higher than the predetermined rate and that is close to the image height in which an aberration correction amount becomes greatest.

Figure 9:
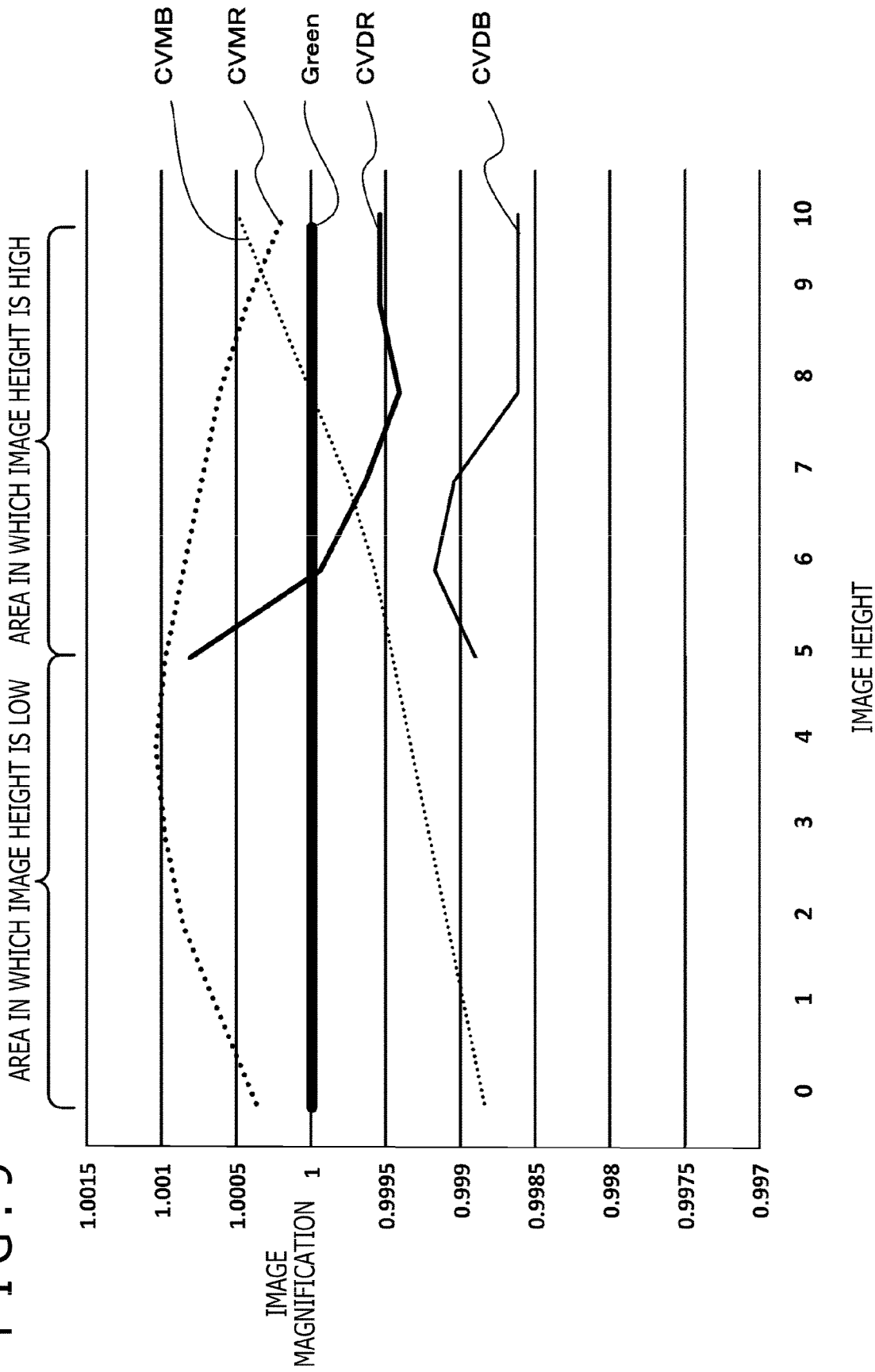
FIG. 9 is a diagram exemplifying an aberration amount to be corrected and an aberration amount detected by the simple detection processing.

FIG. 9 exemplifies an aberration amount to be corrected and an aberration amount detected by the simple detection processing. In FIG. 9, a horizontal axis represents a highest image height in the captured image to be "10" and a center of the captured image to be "0." Further, a longitudinal axis represents an image magnification and exemplifies the image magnification of a red-color captured image and a blue-color captured image to a green-color captured image (Green) in which visibility is high and an information amount is great. An aberration of the red-color captured image to be corrected on the basis of the retention aberration information is, for example, a characteristic CVMR. Further, an aberration of the blue-color captured image to be corrected on the basis of the retention aberration information is, for example, a characteristic CVMB. Further, an area in which the image height is higher than the predetermined rate is used as the detection area of the simple detection processing. The aberration of the red-color captured image detected by the simple detection processing is, for example, a characteristic CVDR and the aberration of the blue-color captured image detected by the simple detection processing is, for example, a characteristic CVDB. With respect to the respective captured images of a red color and a blue color, the reliability determination section performs the scoring processing on a difference between the aberration to be corrected on the basis of the retention aberration information and the aberration detected by the simple detection processing and performs the reliability determination by using the calculated scoring value. Further, the reliability determination section uses the retention aberration information as the application aberration information on the basis of the reliability determination result or uses the detection aberration information generated by performing the aberration detection processing as the application aberration correction information.

Also, a series of processing described in the specification can be performed by hardware, software, or both mixed constitutions. In a case where the processing is performed by software, programs in which a processing sequence is recorded are installed in a memory in a computer incorporated in dedicated hardware and are executed. Alternatively, programs can be installed in a general-purpose computer capable of performing various processing and can be executed.

For example, programs can be recorded in advance in a hard disk, an SSD (Solid State Drive), or a ROM (Read Only Memory) as a recording medium. Alternatively, programs can be temporarily or permanently stored (recorded) in a removable recording medium such as a flexible disc, a CD-ROM (Compact Disc Read Only Memory), an MO (Magneto optical) disc, a DVD (Digital Versatile Disc), a BD (Blu-Ray Disc (registered trademark)), a magnetic disc, or a semiconductor memory card. Such a removable recording medium can be provided as so-called package software.

Also, in addition to being installed in the computer from the removable recording medium, the program may be transferred by a radio channel or through a wired line to the computer from a download site through a network such as a LAN (Local Area Network) or the Internet. The computer can receive the program transferred as described above and install the program in a recording medium such as a built-in hard disk.

In addition, the effects described in the present specification are merely illustrative and not limited thereto, and there may be additional effects not described. Also, the present technology should not be construed to be limited to the foregoing embodiments of the technology. The embodiments of the technology disclose the present technology in the form of examples and it is obvious that those skilled in the art can make modifications and substitutions of the embodiments without departing from the gist of the present technology. That is, in order to determine the gist of the present technology, the scope of the claims should be considered.

Also, the image processing apparatus of the present technology may also take the following configurations.

(1)

An image processing apparatus including:

a control section configured to determine that it is necessary to generate detection aberration information for correcting an aberration of a captured image in a case where it is determined that retention aberration information is unreliable.

(2)

The image processing apparatus according to (1), further including:

a lens aberration detection processing section configured to generate the detection aberration information by performing aberration detection processing in a case where it is determined by the control section that it is necessary to generate the detection aberration information.

(3)

The image processing apparatus according to (2), in which the control section updates the retention aberration information by using the detection aberration information.

(4)

The image processing apparatus according to (2) or (3), in which the control section, in a case where it is determined that the retention aberration information is reliable, sets the retention aberration information as application aberration information.

(5)

The image processing apparatus according to (4), further including:

a lens aberration correction processing section configured to perform aberration correction processing of the captured image by using the application aberration information.

(6)

The image processing apparatus according to (4) or (5), further including:

an association section configured to associate the application aberration information with the captured image.

(7)

The image processing apparatus according to any one of (4) to (6), in which the control section, in a case where an operation mode is an imaging mode in which an imaging interval is shorter than a predetermined value, sets the retention aberration information as the application aberration information.

(8)

The image processing apparatus according to any one of (2) to (7), in which the retention aberration information is information regarding a lens aberration occurred in an imaging optical system of an interchangeable lens.

(9)

The image processing apparatus according to (8), in which the control section, in a case where the interchangeable lens is mounted, determines reliability of the retention aberration information.

(10)

The image processing apparatus according to (8) or (9), in which the control section uses aberration information retained in the interchangeable lens as the retention aberration information.

(11)

The image processing apparatus according to any one of (8) to (10), in which the control section updates the aberration information retained in the interchangeable lens by using the detection aberration information generated by the lens aberration detection processing section.

(12)

The image processing apparatus according to any one of (8) to (11), in which the control section, in a case where the aberration information cannot be acquired from the interchangeable lens, sets the aberration information retained in the image processing apparatus as the retention aberration information.

(13)

The image processing apparatus according to any one of (8) to (12), in which the control section determines the reliability of the retention aberration information by using a mounting detection result of the interchangeable lens.

(14)

The image processing apparatus according to any one of (2) to (13), in which the control section determines the reliability of the retention aberration information by using simple aberration information detected by simple aberration detection processing that is simpler than the aberration detection processing.

(15)

The image processing apparatus according to (14), in which the control section, in a case where an index indicating the reliability is smaller than a first determination threshold value, determines that the retention aberration information is unreliable, in a case where the index is greater than or equal to the first determination threshold value and is smaller than a second determination threshold value that is a threshold value that is greater than the first determination threshold value, sets the simple aberration information as the application aberration information used for an aberration correction, and, in a case where the index is greater than the second determination threshold value, sets the retention aberration information as the application aberration information.

(16)

The image processing apparatus according to any one of (1) to (15), in which the control section determines the reliability of the retention aberration information by using at least any one of imaging setting information regarding imaging setting, captured image calculation information calculated by using the captured image as an aberration correction object, or the attribute information of the retention aberration information.

INDUSTRIAL APPLICABILITY

According to the image processing apparatus, the image processing method, and the program of the present technology, in a case where it is determined that the retention aberration information is unreliable, it is determined that it is necessary to generate the application aberration information for correcting the aberration of the captured image. Therefore, because generation of the aberration information is performed only in a necessary case, a possibility that an opportunity of performing the photographing by the user is lost can be reduced. Therefore, the present technology is appropriate for equipment that performs editing, etc. of the captured images generated by the imaging apparatus.

REFERENCE SIGNS LIST

30 . . . Image processing apparatus
31 . . . In-apparatus aberration information retention section 32 . . . Lens aberration detection processing section
33 . . . Lens aberration correction processing section
34 . . . Association section
50 . . . Control section
501 . . . Reliability determination section
5011 to 5013, 5015, 5017, 5018 . . . Scoring processing section
5014 . . . Image difference calculation section
5016 . . . Simple aberration detection processing section
5019 . . . Determination processing section

The invention claimed is:

1. An image processing apparatus comprising:
a memory including a control program; and
an electronic processor that, when executing the control program, is configured to detect an aberration trigger event occurred in an imaging optical system,
retrieve retention aberration information in response to detecting the aberration trigger event occurred in the imaging optical system,
determine whether the retention aberration information is unreliable with respect to a correction of an aberration of an image that is captured by the imaging optical system, and
generate detection aberration information that corrects the aberration in response to determining that the retention aberration information is unreliable with respect to the correction of the aberration,
wherein the detection aberration information that is generated is different and distinct from the retention aberration information that is retrieved.

2. The image processing apparatus according to claim 1, wherein the memory further includes a lens aberration detection processing program, and
wherein the electronic processor, when executing the lens aberration detection processing program, is configured to generate the detection aberration information by performing aberration detection processing.

3. The image processing apparatus according to claim 2, wherein the electronic processor, when executing the control program, is configured to update the retention aberration information by using the detection aberration information.

4. The image processing apparatus according to claim 2, wherein the electronic processor, when executing the control program, is further configured to set the retention aberration information as application aberration information in response to determining that the retention aberration information is reliable.

5. The image processing apparatus according to claim 4, wherein the memory further includes a lens aberration correction processing program, and
wherein the electronic processor, when executing the lens aberration correction processing program, is configured to perform aberration correction processing of the image captured with the imaging optical system and by using the application aberration information.

6. The image processing apparatus according to claim 4, wherein the memory further includes an association program, and
wherein the electronic processor, when executing the association program, is configured to associate the application aberration information with the image captured with the imaging optical system.

7. The image processing apparatus according to claim 4, wherein the electronic processor, when executing the control program, is configured to
determine whether an operation mode is an imaging mode in which an imaging interval is shorter than a predetermined value, and
set the retention aberration information as the application aberration information in response to determining that the operation mode is the imaging mode in which the imaging interval is shorter than the predetermined value.

8. The image processing apparatus according to claim 2, wherein the retention aberration information is information regarding a lens aberration that occurred in the imaging optical system of an interchangeable lens.

9. The image processing apparatus according to claim 8, wherein the electronic processor, when executing the control program, is configured to
determine whether the interchangeable lens is mounted, and
determine whether the retention aberration information is unreliable in response to determining that the interchangeable lens is mounted.

10. The image processing apparatus according to claim 8, wherein the electronic processor, when executing the control program, is configured to use aberration information retained in the interchangeable lens as the retention aberration information.

11. The image processing apparatus according to claim 10, wherein the electronic processor, when executing the control program, is configured to update the aberration information retained in the interchangeable lens based on the detection aberration information that is generated by executing the lens aberration detection processing program.

12. The image processing apparatus according to claim 2, wherein the electronic processor, when executing the control program, is configured to
determine whether aberration information can be acquired from an interchangeable lens, and
set the aberration information retained in the image processing apparatus as the retention aberration information in response to determining that the aberration information cannot be acquired from the interchangeable lens.

13. The image processing apparatus according to claim 8, wherein the electronic processor, when executing the control program, is configured to
detect a mounting detection result of the interchangeable lens, and
determine whether the retention aberration information is unreliable based on the mounting detection result of the interchangeable lens.

14. The image processing apparatus according to claim 2, wherein the electronic processor, when executing the control program, is configured to
detect simple aberration information using simple aberration detection processing that is simpler than the aberration detection processing, and
determine whether the retention aberration information is unreliable based on the simple aberration information.

15. The image processing apparatus according to claim 14, wherein the simple aberration information is an index, and
wherein the electronic processor, when executing the control program, is configured to
determine that the retention aberration information is unreliable when the index is smaller than a first determination threshold value,
set the simple aberration information as an application aberration information used for an aberration correction when the index is greater than or equal to the first determination threshold value and is smaller than a second determination threshold value that is a threshold value that is greater than the first determination threshold value, and set the retention aberration information as the application aberration information when the index is greater than the second determination threshold value.

16. The image processing apparatus according to claim 1, wherein the electronic processor, when executing the control program, is configured to
determine whether the retention aberration information is unreliable based on at least any one of:
imaging setting information regarding imaging setting, captured image calculation information calculated by using the captured image as an aberration correction object, or
attribute information of the retention aberration information.

17. An image processing method comprising:
detecting, with an electronic processor, an aberration trigger event occurred in an imaging optical system;
receiving, with the electronic processor, retention aberration information in response to detecting the aberration trigger event occurred in the imaging optical system;
determining, with the electronic processor, whether the retention aberration information is unreliable with respect to a correction of an aberration of an image that is captured by the imaging optical system; and
generating, with the electronic processor, detection aberration information that corrects the aberration in response to determining that the retention aberration information is unreliable with respect to the correction of the aberration,
wherein the detection aberration information that is generated is different and distinct from the retention aberration information that is retrieved.

18. A non-transitory computer-readable medium comprising a program that, when executed by an electronic processor, causes the electronic processor to perform a set of operations comprising:
detecting an aberration trigger event occurred in an imaging optical system;
retrieving retention aberration information in response to detecting the aberration trigger event occurred in the imaging optical system;
determining whether the retention aberration information is unreliable with respect to a correction of an aberration of an image that is captured by the imaging optical system; and
generating detection aberration information that corrects the aberration in response to determining that the retention aberration information is unreliable with respect to the correction of the aberration,
wherein the detection aberration information that is generated is different and distinct from the retention aberration information that is retrieved.

19. The non-transitory computer-readable medium according to claim 18, wherein the set of operations further includes generating the detection aberration information by performing aberration detection processing.

20. The image processing method according to claim 17, further comprising generating the detection aberration information by performing aberration detection processing.

21. The image processing apparatus according to claim 1, wherein the aberration trigger event includes one or more events from a group consisting of:
a first trigger event being a detection by the electronic processor that the aberration occurred in the imaging optical system,
a second trigger event being a detection by the electronic processor of an addition of an interchangeable lens to the imaging optical system,
a third trigger event being a detection by the electronic processor of a power-on state command,
a fourth trigger event being a detection by the electronic processor of a power-off state command,
a fifth trigger event being a detection by the electronic processor of a command to change from a first operational mode to a second operational mode that is different from the first operational mode,
a sixth trigger event being a detection by the electronic processor of an imaging recording action input,
a seventh trigger event being a detection by the electronic processor of a series of photographing action inputs, and
an eighth trigger event being a detection by the electronic processor that a predetermined period of time has elapsed.

* * * * *